United States Patent Office 3,836,606
Patented Sept. 17, 1974

---

3,836,606
UNSATURATED POLYESTER RESINS
Melvin E. Baum, Monroeville, Pa., assignor to
Koppers Company, Inc.
No Drawing. Continuation of abandoned application Ser. No. 29,370, Mar. 20, 1970. This application Apr. 24, 1972, Ser. No. 247,214
Int. Cl. C08f 21/02
U.S. Cl. 260—861                                      7 Claims

ABSTRACT OF THE DISCLOSURE

A crosslinkable unsaturated polyester resin, which can be used to prepare articles having improved electrical and thermal stability properties, is prepared by reacting maleic anhydride or fumaric acid with 1-cyclohexene-1,2-dicarboxylic anhydride, cyclohexanedimethanol and neopentyl glycol. Polymerizable compositions containing the aforementioned resins and a vinyl monomeric crosslinking agent and articles made from the polymerizable composition are disclosed also.

---

This is a continuation of application Ser. No. 29,370, filed Mar. 20, 1970, now abandoned.

This invention relates to unsaturated polyester resins of the type that can be reacted with a vinyl monomeric crosslinking agent to form a thermoset polymer. More particularly, this invention relates to unsaturated polyester resins which upon being reacted or cured with a vinyl monomeric crosslinking agent can be formed into articles having improved electrical and thermal stability properties.

Unsaturated polyester resins which are prepared by reacting an alpha, beta-ethylenically unsaturated dicarboxylic acid (or an anhydride thereof), a dihydric alcohol and optionally a saturated dicarboxylic acid (or anhydride thereof) are well known. Generally speaking, thermoset plastic articles can be prepared from such resins by molding and curing a polymerizable composition which contains the aforementioned type of resin dissolved in a vinyl monomeric crosslinking agent which is capable of reacting with the resin.

There are many compounds within the aforementioned classes of acids, anhydrides and alcohols that can be used to prepare unsaturated polyester resins. A few examples of unsaturated dicarboxylic acids and anhydrides that can be used to prepare unsaturated polyester resins are fumaric acid, maleic anhydride and itaconic acid. A few examples of dihydric alcohols that can be used to prepare unsaturated polyester resins are ethylene glycol, propylene glycol, cyclohexanedimethanol, neopentyl glycol and triethylene glycol. A few examples of saturated dicarboxylic acids and anhydrides that can be used to prepare unsaturated polyester resins are phthalic anhydride, tetrahydrophthalic anhydride (including its various isomers, for example, 4-cyclohexene-1,2-dicarboxylic anhydride and 1-cyclohexene-1,2-dicarboxylic anhydride) and adipic acid. It is noted that many acids, anhydrides and alcohols other than the aforementioned examples can be used to prepare unsaturated polyester resins.

Styrene and vinyl toluene are examples of vinyl monomeric crosslinking agents that can be combined with resins of the aforementioned type to prepare polymerizable compositions that can be cured and molded into articles.

Articles prepared from such polymerizable compositions have generally good physical and electrical properties and good chemical resistance and weathering characteristics. Fibrous reinforcements, such as glass fibers, are added usually to the polymerizable compositions for the purpose of improving the strength of articles made therefrom.

In addition, it is known that articles with particularly good properties of one specific type or another can be prepared by utilizing unsaturated polyester resins that have been prepared from particular ingredients. For example, it is known that when a saturated chlorinated dicarboxylic acid is used in preparing the resin, articles made therefrom have improved flame resistance.

This invention is directed to the preparation of unsaturated polyester resins that can be used in forming articles having particularly good electrical and thermal stability properties. As mentioned above, articles made of crosslinked polyester resins generaly have good overall properties, including good electrical properties. However, there are applications wherein the use of articles made of general purpose polyester resins is not satisfactory because the severe electrical and thermal stability demands made on the article exceed those properties of the article.

An object of this invention is to provide an unsaturated polyester resin which upon being polymerized with a vinyl monomeric crosslinking agent produces a thermoset plastic article which has exceptionally good electrical properties and thermal stability properties.

It is another object of this invention to provide a polymerizable polyester resin composition which can be cured and molded into articles having improved properties, including improved electrical and thermal stability properties.

It is still another object of this invention to provide plastic articles having improved properties.

In accordance with this invention, it has been found that an unsaturated polyester resin that is prepared by reacting a combination of specifically selected reactants can be used to prepare articles having improved properties, including patricularly good electrical and thermal stability properties. Generally speaking, the unsaturated polyester resins included within the scope of this invention are prepared by reacting:

(a) maleic anhydride or fumaric acid;
(b) 1-cyclohexene-1,2-dicarboxylic anhydrides;
(c) cyclohexanedimethanol and
(d) neopentyl glycol.

It has been found that unsaturated polyester resins prepared by reacting the aforementioned ingredients are soluble in and reactable with vinyl monomeric crosslinking agents and that formulations containing these ingredients can be cured and molded into articles which have outstanding electrical and thermal stability properties. In addition, articles made from such formulations have generally good overall strength. Thus, unsaturated polyester resins within the scope of this invention can be used to excellent advantage in preparing articles which are used in applications where very good electrical properties are needed and/or in applications where the articles are exposed to elevated temperatures for relatively long periods of time. Examples of articles which can be prepared from the resins of this invention are cast insulators and electrical grade shapes such as sheets, buckets and booms.

It is very surprising and unexpected, for a number of reasons, that articles made from the resins of this invention have the exceptional electrical and thermal stability properties that they possess. For example, it has been found that heretofore known unsaturated polyester resins made from neopentyl glycol (one of the ingredients used in making the resins of this invention) can be used to make articles with unusually good electrical properties, but that such articles have relatively poor thermal stability properties, that is they lose excessive weight when exposed to high temperatures for lengthy periods of time. (This is caused by heat degradation of the material and volatilization thereof.) It has been found also that articles prepared from heretofore known unsaturated polyester resins made from 1,4-cyclohexanedimethanol (another ingredient that can be used in making the resins of this invention) have relatively good electrical properties and thermal stability properties, but that resins made from this alcohol and maleic anhydride are relatively incompatible with conventional crosslinking agents such as styrene. It has been suggested that this incompatability problem can be overcome by substituting phthalic anhydride for a portion of the maleic anhydride, but articles made from such resins have relatively poor thermal stability properties.

On the other hand, when the aforementioned reactants, that is neopentyl glycol and 1,4-cyclohexanedimethanol, are reacted with the other reactants used to prepare the resins of this invention, the resulting resins can be used to prepare articles with outstanding electrical and thermal stability properties and in addition, they are compatible with and soluble in styrene, as well as other crosslinking agents.

The surprising properties of articles made from the resins described herein are further manifested in the examples set forth below from which it will be seen that articles made from the resins of this invention have drastically improved thermal stability properties over articles made from a resin alike in all respects to the resins of this invention except for the use of a different isomer of the cyclohexene-1,2-dicarboxylic anhydride ingredient used in preparing the resins of this invention.

As will be described more fully below, the unsaturated polyester resins described herein can be prepared under reaction conditions which are generally used in preparing heretofore known unsaturated polyester resins and they can be combined with other ingredients that are added generally to polymerizable polyester formulations which are curable and moldable into articles according to available techniques.

Turning now to a detailed description of the invention, unsaturated polyester resins included within the scope of this invention can be prepared by reacting:

(a) about 20 to about 40 mole percent and preferably about 30 to about 40 mole percent of an unsaturate selected from the group consisting of maleic anhydride and fumaric acid;

(b) about 10 to about 30 mole percent and preferably about 10 to about 20 mole percent of 1-cyclohexene-1,2-dicarboxylic anhydride;

(c) about 10 to about 40 mole percent and preferably about 15 to about 35 mole percent of cyclohexanedimethanol; and (d) about 10 to about 40 mole percent and preferably about 15 to about 35 mole percent of neopentyl glycol.

Each of the aforementioned reactants which are used to prepare the polyester resins of this invention and processes for preparing the reactants are well known.

With respect to the 1-cyclohexene-1,2-dicarboxylic anhydride ingredient, it is noted that this compound has the structural formula set forth below:

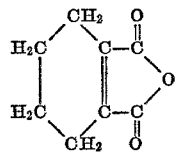

The compound of the structural formula set forth above belongs to the class of compounds generally referred to as tetrahydrophthalic anhydride. Compounds within this class can exist in various isomeric forms, depending, for example, on the position of the double bond in the ring. The 1-cyclohexene-1,2-dicarboxylic anhydride isomer pictured above is often referred to as delta-1 tetrahydrophthalic anhydride and for convenience it will be so referred to herein. (See, for example, U.S. Pat. No. 2,-764,597, which discloses also a method for preparing this isomer from the corresponding delta-4 isomer, that is 4-cyclohexene-1,2-dicarboxylic anhydride (the isomer wherein the double bond is positioned between the two carbon atoms directly across from the two carbon atoms joined by the double bond in the above structural formula).

Delta-1 tetrahydrophthalic anhydride can be prepared in pure or substantially pure form. However, when preparing this compound, it is not unusual to obtain a mixture of tetrahydrophthalic anhydrides in their various isomeric forms along with minor quantities of reaction by-products. It has been found that such mixtures can be used to prepare the resins of this invention. For example, there can be used a tetrahydrophthalic anhydride mixture that contains about 80 wt. percent of the delta-1 isomer, about 3 wt. percent of the delta-2 isomer, about 1 wt. percent of the delta-3 isomer and about 8 wt. percent of the delta-4 isomer with the remainder of the mixture consisting of reaction by-products.

It is believed that when pure or substantially pure delta-1 tetrahydrophthalic anhydride or when a mixture of tetrahydrophthalic anhydrides in their various isomeric forms are exposed to the polyesterification reaction conditions that can be used to prepare the resins of this invention, the delta-1 isomer, as well as other isomers that may be present in the mixture, undergo isomerization and that the resultant isomers enter into the polyesterification reaction and become a part of the polymeric chain that makes up the unsaturated polyester resin. Indeed, analysis of unsaturated polyester resins within the scope of this invention made from either a mixture of isomers of tetrahydrophthalic anhydride or from pure or substantially pure delta-1 tetrahydrophthalic anhydride contain various isomers of tetrahydrophthalic anhydride and in amounts that are different from the amounts that were present in the original reaction mixture.

Although mixtures of various isomers of tetrahydrophthalic anhydride can be used to prepare resins within the scope of this invention, the mixture should contain sufficient amounts of the delta-1 isomer so that the resultant unsaturated polyester resin contains at least about 35 wt. percent and preferably at least about 40 wt. percent of the delta-1 tetrahydrophthalic anhydride. (This amount is based on the total amount of tetrahydrophthalic anhydride that is present in the resin.) Although resins containing somewhat lesser amounts of the delta-1 isomer can be produced, there is a risk that the resins will not have the desirable electrical and thermal stability properties.

In producing resins which contain at least about 35 wt. percent of the delta-1 isomer from a mixture of isomers of tetrahydrophthalic anhydride, the mixture should contain at least about 75 wt. percent and preferably about 80 wt. percent (based on the total weight of the mixture and thus including minor amounts of reaction by-products) of the delata-1 tetrahydrophthalic anhydride isomer. However, it should be understood that conditions under which the polyesterification reaction are conducted will have a bearing on the extent to which the isomers of the mixture change from one form to another; consequently, under certain polyesterification reaction conditions, a mixture of isomers containing lesser amounts than 75 wt. percent of the delta-1 isomer my be sufficient to give a polyester resin that contains at least about 35 wt. percent of the delta-1 isomer.

In view of the above, it should be understood that mixtures of isomers of tetrahydrophthalic anhydride, other than the one specifically mentioned above, and that pure or substantially pure delta-1 tetrahydrophthalic anhydride can be used to prepare the resin of this invention. As mentioned hereinabove, the amount of delta-1 tetrahydrophthalic anhydride used to prepare the resins of this invention should comprise about 10 to about 30 mole percent and preferably about 10 to 20 mole percent of the polyesterification reaction mixture. When utilizing a mixture of isomers of tetrahydrophthalic anhydride, it can be present in the polyesterification reaction mixture in these same amounts. In this case, of course, the actual amount of the delta-1 isomer in the reaction mixture may be less than 10 mole percent.

As to the other reactants that are used to prepare the resins of this invention, they are well known compounds as mentioned hereinabove. Maleic acid and its isomer, fumaric acid, are commercially available as is neopentyl gylcol (2,2-dimethyl-1,3-propanediol). Although any of the isomers of cyclohexanedimethanol can be used, it is preferred to use 1,4-cyclohexanedimethanol because of the results that are obtained with it and because of its availability.

The unsaturated polyester resins of this invention can be prepared according to techniques that are used generally in preparing unsaturated polyester resins. It is preferred to use a two stage reaction preparation due to the relatively low reactivity of the delta-1 tetrahydrophthalic anhydride ingredient (and of the other isomers when a mixture is used). By way of example, the first stage of the reaction should include the reaction of the delta-1 tetrahydrophthalic anhydride with all or a portion of the alcoholic reactants. The first reaction stage can be carried out at temperatures within the range of about 200° C. to about 250° C. and for a period of time ranging from about 5 to about 15 hours. After the reaction mixture has an acid number within the range of about 0 to about 5, the maleic anhydride or fumaric acid ingredient and any remaining portion of the alchol or alcohols can be added to the reaction mixture which can then be heated to a temperature within the range of about 170° C. to about 210° C. for a period of time ranging from about 2 hours to about 8 hours. The reaction should be allowed to proceed until the polyester resin that is produced has an acid number below about 50 and preferably below about 25.

Although other methods can be utilized to prepare the unsaturated polyester resin described herein, the preferred method described generally above has advantages over them. For example, if a one stage reaction or cook is used, the relatively high temperatures that would have to be used to get the tetrahydrophthalic anhydride to react at a practical rate would present the risk of having the reaction mixture gel due to the polyesters reacting with themselves; if lower temperatures are used to avoid this problem, then the rate of the reaction is so slow as to be impractical.

Whatever specific reaction method is used, standard equipment and techniques can be employed in preparing the resins of this invention. For example, the polyesterification reaction should be carried out under an inert blanket of gas such as nitrogen and the reaction vessel should be equipped with a stirrer and means for removing water formed from the esterification reaction. In addition, a gelation inhibitor such as, for example, hydroquinone can be added to the reaction mixture. Also, the polyesterification reaction can be carried out in the presence of an esterification catalyst.

The ratio of the amounts of acid and anhydrides and alcohols charged to the reaction vessel can be a ratio used typically in a polyesterification reaction. Speaking generally, the total moles of acid and anhydrides present in the reaction mixture should be about equal to the total moles of alcohols used; however, it is preferred that there be charged to the reaction vessel an excess of about 10 mole percent of the alcohols. The excess of the alcohol can compensate for losses due to boiling-off of the alcoholic ingredients.

Polymerizable compositions that can be molded and cured into articles can be prepared by combining the unsaturated polyester resin described herein with available vinyl monomeric crosslinking agents which are capable of polymerizing with the unsaturated polyester resin. Examples of crosslinking agents, which it is noted contain alpha, beta-ethylenic unsaturation, are styrene, vinyl toluene, alpha-methyl styrene and chlorostyrene. It should be noted that other crosslinking agents can be used.

In addition, the polymerizable composition containing the unsaturated polyester resin and the crosslinking agent can contain other materials often included in this class of compositions. Examples of such materials include fillers, initiators or catalysts, crosslinking and stabilizing inhibitors, accelerators or promoters, pigments, mold release additives, fibrous reinforcements, chemical thickening agents (such as, for example, magnesium oxide) and thermoplastic polymers such as, for example, polystyrene, polymethylmethacrylate, styrene-acrylonitrile copolymers as well as others.

The polymerizable composition can be cured and molded into articles according to available techniques including for example, vacuum and pressure bag techniques and pultrusion, or articles can be made in matched-metal molds utilizing premix or wet lay-up techniques. In addition, the polymerizable compositions can be formed into chemically thickened mats or prepegs which can be molded in a matched-metal mold.

Set forth below are examples which are illustrative of compositions within the scope of this invention, as well as examples of other compositions which are included for the purpose of comparing their properties with compositions of this invention. In those examples which show the preparation of unsaturated polyester resins, the reaction equipment included a reaction vessel suited for a polyesterification reaction and thus equipped with a stirrer, a reflux condenser and apparatus for maintaining the polyesterification reaction under an inert blanket of nitrogen.

EXAMPLE 1

This example shows the preparation of an unsaturated polyester resin within the scope of this invention.

One-half mole of delta-1 tetrahydrophthalic anhydride (99 wt. percent pure), 1 mole of 1,4-cyclohexanedimethanol and 0.17 grams of monotert-butylhydroquinone (an inhibitor) were added to a reaction vessel. The reactants were heated to about 250° C. over a 1.5 hour and then reacted for about six hours at 250° C. At the end of this time the reaction mixture had an acid number of about 5. The reaction mixture was cooled to 150° C. and there were then added to the reaction vessel 1 mole on neopentyl glycol and 1.5 moles of maleic anhydride. The reactants were maintained at a temperature within the range of 150° C. to 200° C. for about 1.5 hours and then at 200° C. for about 3.5 hours. The unsaturated polyester resin that was recovered from the reaction vessel had an acid number of about 25, a fumarate content of 67% and a molecular weight (number average) of about 1,960; a solution containing 60 wt. percent of the resin and 40 wt. percent of vinyl toluene had a viscosity at room temperature of 1400 cps.

EXAMPLE 2

This example shows the preparation of a flat sheet casting (about ⅛″ thick) from the unsaturated polyester resin of Example 1.

A solution of 60 wt. percent of the unsaturated polyester resin of Example 1 and 40 wt. percent of vinyl toluene crosslinking agent was prepared. The resin readily dissolved in the vinyl toluene. To this solution there was added 0.75 wt. percent based on the weight of mixture of benzyol peroxide catalyst. The solution was cured between two glass panes into a ⅛″ casting by heating for two hours at 75° C. and then for two hours at 150° C.

The excellent thermal stability properties of articles made from compositions within the scope of this invention are exemplified by the test results reported in Table I below. The results were obtained by subjecting castings made in accordance with Example 2 above to a temperature of 260° C. for the various periods of time set forth in the table. The test results are expressed in percent loss of weight of the casting—the lower the percent loss of weight, the better the thermal stability properties. For purposes of comparison, there is set forth also in Table I the test results that were obtained for a casting made from an unsaturated polyester resin that was prepared from the same ingredients present in the same molar ratios as the resin of Example 1 above, except that delta-4 tetrahydrophthalic anhydride was substituted for the delta-1 tetrahydrophthalic anhydride. The comparative casting was made in exactly the same way as the casting of Example 2.

TABLE I

| | Percent loss of weight at 260° C. | |
|---|---|---|
| Test period | Casting of example 2 | Casting of comparative example |
| 1 week | 3.8 | 30 |
| 3 weeks | 7.2 | |
| 6 weeks | 10 | |

As can be seen from the test results reported in Table I above for the castings that were tested for one week, the comparative casting made from the unsaturated polyester resin prepared from the delta-4 tetrahydrophthalic anhydride lost almost 700% more weight than the casting of Example 2 made from the resin of Example 1, that is the resin within the scope of this invention that was prepared from the delta-1 tetrahydrophthalic anhydride. It is noted also that the castings that were tested for the three and six week periods, which castings were prepared from the delta-1 isomer, experienced much less loss in weight than the "delta-4" casting experienced in only one week. The performance of the delta-4 castings was so poor after one week of testing that further testing of the casting was discontinued.

As mentioned hereinabove, the unsaturated polyester resins of this invention can be used to produce articles which also have relatively good physical properties. This is evidenced by the values set forth in Table II below which were obtained by testing castings made in accordance with Example 2 above.

TABLE II

| Test: | Test results |
|---|---|
| ASTM D-638: | |
| Tensile strength p.s.i. | 5,300 |
| Tensile modulus p.s.i. | 478,000 |
| Tensile elongation percent | 1.51 |
| ASTM D-790: | |
| Flexural strength, room temp. p.s.i. | 14,700 |
| Flexural modulus, room temp. p.s.i. | 451,000 |
| Flexural strength, 240° F. p.s.i. | 3,000 |
| Flexural modulus, 240° F. p.s.i. | 145,000 |
| ASTM D-648-56—Deflection temp. ° F. | 235 |
| ASTM D-2583-67—Barcol hardness | 47 |

As will be appreciated from the results reported in Table II above, articles made from the unsaturated polyester resins of this invention have physical properties that compare favorably with those made from heretofore known polyester resins.

EXAMPLE 3

This example is illustrative of the preparation of another unsaturated polyester resin within the scope of this invention.

Three hundred and four grams of a mixture comprising 97% delta-1 tetrahydrophthalic anhydride (and thus about 1.94 moles) and two moles of 1,4-cyclohexanedimethanol were added to a reaction vessel and the temperature of the vessel was raised to 250° C. over a 1.5 hour period. The ingredients were allowed to react for 15 hours at 250° C. At the end of this time the reaction mixture had an acid number of about 10. The temperature of the mixture was dropped to 150° C. Thereafter, two moles of neopentyl glycol, two moles of maleic anhdyride and 0.37 gram of the inhibitor used in preparing the resin of Example 1 were added to the reaction vessel. The ingredients were heated to a temperature of 200° C. over a one hour period and then allowed to react for 7 hours at 200° C. The unsaturated polyester resin that was produced had an acid number of 21, a fumarate content of 69% and a molecular weight of about 1610; a solution containing 60 wt. percent of the resin and 40 wt. percent of vinyl toluene had a viscosity at room temperature of 1150 cps.

EXAMPLE 4

This example shows the preparation of a flat sheet casting (about ⅛" thick) from the unsaturated polyester resin of Example 3.

A solution of 60 wt. percent of the unsaturated polyester resin of Example 3 and 40 wt. percent of vinyl toluene was prepared. The resin dissolved readily in the vinyl toluene. There was added to the solution 0.75% by weight based on the weight of the mixture of benzoyl peroxide. The cured solution was cured between two glass panes into a ⅛" casting by heating for two hours at 75° C. and then for two hours at 150° C.

The casting was tested for thermal stability properties. The percent losses of weight of a casting exposed to a temperature of 260° C. for a one week and six week period was 6.4 and 15 respectively.

EXAMPLE 5

This example is illustrative of the preparation of another unsaturated polyester resin within the scope of this invention.

About 1.6 moles of delta-1 tetrahydrophthalic anhydride and two moles of 1,4-cyclohexanedimethanol were added to a reaction vessel. (The delta-1 isomer was added in the form of a mixture of isomers of tetrahydrophthalic anhydride in which mixture there was present: 80 wt. percent of the delta-1 isomer; 3 wt. percent of the delta-2 isomer; 1 wt. percent of the delta-3 isomer; and 8 wt. percent of the delta-4 isomer with the remainder of the mixture comprising reaction by-products. The total weight of the mixture was 304 grams and it thus contained about 1.6 moles of the delta-1 isomer.) The temperature of the vessel was raised to 210° C. over a one hour period and then to 250° C. over a 1.5 hour period. Thereafter, the ingredients were allowed to react for 14 hours at a temperature within the range of 245° C. to 250° C. At the end of this time, the reaction mixture had an acid number of about 12. The temperature of the mixture was cooled to 150° C. Thereafter, 2 moles of neopentyl glycol, 2 moles of maleic anhydride and 0.37 grams of the inhibitor used in preparing the resin of Example 1 were added to the vessel. The ingredients were heated to a temperature of 200° C. over a five hour period and then allowed to react for 2 hours at 200° C. The unsaturated polyester resin that was produced had an acid number of about 17, a fumarate content of 60% and a molecular weight of about 1680; a solution containing 60 wt. percent of the resin and 40 wt. percent of vinyl toluene had a viscosity at room temperature of 1100 cps.

EXAMPLE 6

A flat sheet casting about ⅛ inch in thickness was prepared from the unsaturated polyester resin of Example 5 by following the procedure set forth in Example 4.

The casting was tested for thermal stability properties. The percent losses of weight of the casting exposed to a temperature of 260° C. for a one week and six week period were 6.6 and 12 respectively.

As mentioned previously, the resins of this invention can be used to prepare articles that have not only exceptional thermal stability properties, but also excellent electrical properties and good overall physical properties. This is exemplified in Table III below which sets forth the properties of castings of Examples 4 and 6.

TABLE III

| Test | Test results | |
|---|---|---|
| | Casting of example 4 | Casting of example 6 |
| Electrical properties: | | |
| ASTM D-257: | | |
|   Insulation resistance, ohms | $9.5 \times 10^{14}$ | $2.8 \times 10^{14}$ |
|   Volume resistivity, ohms-cm | $7.6 \times 10^{15}$ | $7.6 \times 10^{15}$ |
|   Surface resistivity, ohms | $1.9 \times 10^{15}$ | $1.9 \times 10^{15}$ |
| ASTM D-150: | | |
|   Dielectric constant, 60 Hertz | 3.35 | 3.39 |
|   Dissipation factor, room temp | 0.003 | 0.003 |
|   Dissipation factor, 260° C | 0.115 | 0.225 |
| ASTM D-149: | | |
|   Dielectric strength, short time (1), volts/ml | 468 | 498 |
|   Dielectric strength, short time (11), kv | 60+ | 60+ |
| ASTM D-495: | | |
|   Arc resistance, sec | 115 | 120 |
|   Track resistance, min | 900+ | 900+ |
| Physical properties: | | |
| ASTM D-638: | | |
|   Tensile strength, p.s.i | 8,500 | 8,500 |
|   Tensile modulus, p.s.i | 450,000 | 481,000 |
| ASTM D-790: | | |
|   Flexural strength, room temp., p.s.i | 14,300 | 13,100 |
|   Flexural modulus, room temp., p.s.i | 482,000 | 468,000 |
| ASTM D-648-56: Deflection temp., °F | 167 | 155 |
| ASTM D-2583-67: Barcol hardness | 44 | 45 |

It is noted that the properties of the test castings of Examples 4 and 6 are quite similar—as exemplified by the values set forth in Table III above. It is noted further that the test castings of Example 4 were prepared from the resin of Example 3 which resin was made from relatively pure delta-1 tetrahydrophthalic anhydride whereas the test castings of Example 6 were made from the resin of Example 5 which resin was prepared from a mixture of tetrahydrophthalic anhydride isomers that contained but 80% of the delta-1 isomer. Thus, it can be seen that relatively pure delta-1 tetrahydrophthalic anhydride or a mixture of isomers containing a substantial amount of the delta-1 isomer acn be used to prepare the resins of this invention and that the properties of articles made therefrom are very similar.

In summary, it can be said that the invention encompasses the means whereby the selection of an unique combination of reactants provides for the production of polyester resins from which there can be produced articles which have a combination of outstanding thermal stability and electrical properties, as well as good overall physical properties.

I claim:

1. A method for preparing an unsaturated polyester resin having improved electrical and thermal properties by reacting in resin-forming amounts:
   (a) an unsaturate selected from the group consisting of maleic anhdride and fumaric acid;
   (b) tetrahydrophthalic anhydride, of which at least 75 weight percent is the delta-1 isomer;
   (c) cyclohexanedimethanol; and
   (d) neopentyl glycol;
wherein reactant (b) is first reacted with reactant (c) to form a first polyester and second reacting the first polyester with reactants (a) and (d).

2. A method according to Claim 1 for preparing an unsaturated polyester resin wherein the first reaction is carried out under conditions to yield a first polyester having an acid number in the range of from 0 to about 5.

3. A method according to Claim 2 wherein the unsaturated polyester resin is further reacted with a vinyl monomeric cross-linking agent.

4. A method according to Claim 3 wherein the vinyl monomeric cross-linking agent is vinyl toluene.

5. A method for preparing the unsaturated polyester resin of Claim 1 wherein the following amounts of the reactants are utilized in the reactions:
   about 20 to about 40 mol. percent of reactant (a);
   about 10 to about 30 mol. percent of reactant (b);
   about 10 to about 40 mol. percent of reactant (c); and
   about 10 to about 40 mol. percent of reactant (d).

6. An unsaturated polyester resin prepared by reacting in resin-forming amounts:
   (a) an unsaturate selected from the group consisting of maleic anhydride and fumaric acid;
   (b) tetrahydrophthalic anhydride, of which at least 75 weight percent is the delta-1 isomer;
   (c) cyclohexanedimethanol; and
   (d) neopentyl glycol; and
wherein the resin is prepared by first reacting reactant (b) with reactant (c) to form a first polyester and second reacting the first polyester with reactants (a) and (d).

7. An unsaturated polyester resin according to Claim 6 wherein the first polyester has an acid number in the range of from about 0 to about 5.

References Cited

UNITED STATES PATENTS

| | | | |
|---|---|---|---|
| 3,196,131 | 7/1965 | Mayer et al. | 260—75 |
| 3,275,710 | 9/1966 | Wooster et al. | 260—863 |
| 3,294,620 | 12/1966 | Petropoulos et al. | 161—232 |
| 3,533,999 | 10/1970 | Fekete et al. | 260—75 |
| 3,560,445 | 2/1971 | Fekete et al. | 260—75 |
| 3,674,727 | 7/1972 | Fekete et al. | 260—22 D |

WILLIAM H. SHORT, Primary Examiner

E. A. NIELSEN, Assistant Examiner

U.S. Cl. X.R.

260—75 UA